Aug. 14, 1923. Re. 15,673
G. T. PEARSONS
FIRE EXTINGUISHER
Original Filed June 28, 1916
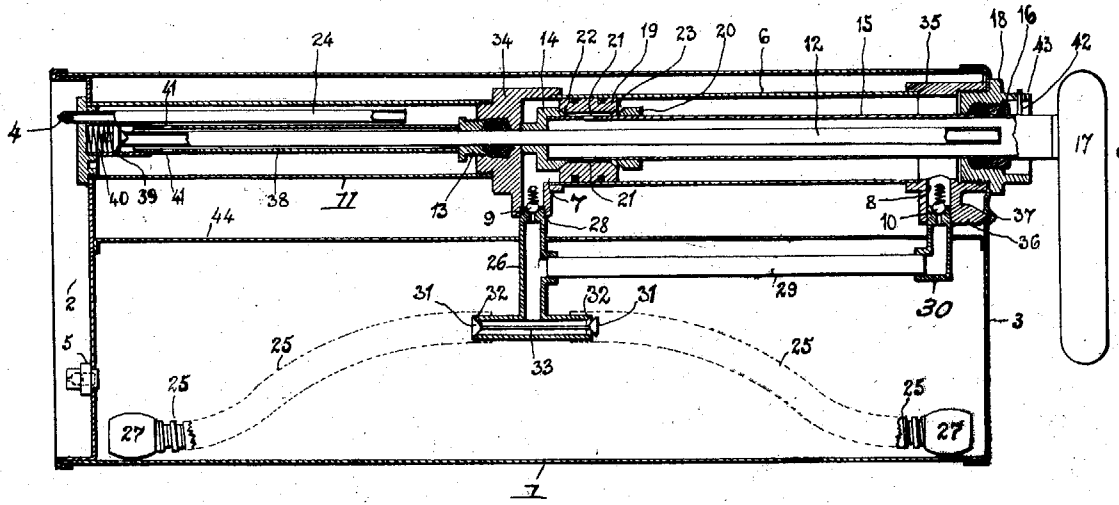
Inventor:
GEO. T. PEARSONS
By his Attorney John O. Seifert Reissued Aug. 14, 1923. Re. 15,673

UNITED STATES PATENT OFFICE.

GEORGE T. PEARSONS, OF NEW YORK, N. Y.

FIRE EXTINGUISHER.

Original No. 1,381,657, dated June 14, 1921. Serial No. 106,322, filed June 28, 1916. Application for reissue filed February 4, 1922. Serial No. 534,270.

*To all whom it may concern:*

Be it known that I, GEORGE T. PEARSONS, a citizen of the United States, residing in the borough of Manhattan, in the city, county, and State of New York, have invented new and useful Improvements in Fire Extinguishers, of which the following is a specification.

This invention relates to syringes to be used as fire extinguishers, in which a stream or jet of liquid is ejected from a reservoir by piston mechanism within the reservoir, and it is the object of the invention to provide improved means to at all times connect the piston chamber with the liquid in the lowermost part of the reservoir to discharge the liquid whether the reservoir is full or partially empty, or held in a horizontal position or inclined upward or downward from the horizontal.

A further object of the invention is to provide improved means to seal the pumping mechanism to prevent leakage when the syringe is not in use.

In carrying out the invention I provide a reservoir or tank and mount a piston chamber therein having suction means to connect said chamber with the reservoir, and connect a flexible tube or tubes to said suction means to extend longitudinally of the reservoir with inlet openings thereto adjacent opposite ends of the reservoir, and said openings adapted to automatically assume a position in the lowermost part of the reservoir when the syringe is held in a horizontal or substantially horizontal position, and provide valve mechanism to shut off one of the tube inlets from the suction means to the piston chamber and connect the other tube inlet thereto to discharge the liquid from the reservoir when it is held in different angular positions relative to the horizontal.

In the drawing accompaanying and forming a part of this specification I have shown a sectional side elevation of a syringe with an embodiment of my invention applied thereto.

I have illustrated an embodiment of my invention in connection with a syringe in which the construction of the pumping mechanism is substantially the same as that disclosed in my copending application filed January 15, 1916, Serial No. 72,207 (patented February 13, 1917, No. 1,215,698) in which there is provided a reservoir or tank for a fire extinguishing liquid consisting of a body portion 1, preferably cylindrical in shape, and the ends 2 and 3 secured thereto, as by soldering or otherwise, the end 2 having a discharge outlet 4 and a filler opening closed by a plug 5 and the said plug being constructed with an inwardly opening and outwardly closing spring check valve to permit entrance of air to the reservoir as the liquid is discharged therefrom shown in a general way by dotted lines. The end 2 is preferably dished to permit of standing of the syringe upon a horizontal surface.

Mounted in the reservoir at one side of the axis of the cylinder adjacent the side is a piston chamber or cylinder 6 having inlets 7 and 8 with inwardly opening and outwardly closing check valves 9 and 10 adjacent opposite ends to connect the cylinder to the reservoir. The cylinder extends from the end of the reservoir opposite to the outlet 4 and is connected to the outlet by a chamber 11 which is in the nature of a compression chamber in which the liquid discharged into said chamber from the piston chamber is placed under pressure. A tube 12 slidably engages in a stuffing box 13 in the cylinder end, said tube extending through a cap 14 into a hollow piston rod 15, said cap being secured to and closing one end of the piston rod and to which cap the tube 12 is fixed. The piston rod extends through a stuffing box 16 to the exterior of the cylinder and reservoir opposite to the outlet 4 and has a hand grip 17 fixed thereto, said stuffing box being carried by a nut 18 which also serves to connect the piston chamber to the reservoir end 3 in a manner to be hereinafter set forth.

A piston head 19 having suitable packing to seal it in the cylinder is mounted on the piston rod 15 to have a limited to and fro movement between the cap 14, which is in the nature of an abutment, and an abutment or collar 20 fixed to the piston rod. The piston rod is connected to the cylinder 6 through ports 21 therein controlled by the piston head 19 to alternately connect the piston rod and the tube 12 with the cylinder at opposite sides of the piston at the commencement of each outward and inward stroke of the piston, and for which purpose the opening in the piston is made of somewhat larger diameter than the diameter of the piston rod to provide a space therebetween, and communication between said space and the piston cylinder is shut off by the abutments 14 and 20, for which purpose the abutments are provided with cone shaped ends 22 and 23 to cooperate with correspondingly cone-shaped seats in the ends of the piston. The tube 12 is preferably centrally of the chamber 11 with the outlet 4 offset from the center of said chamber, a tube 24 being connected to the outlet 4 to connect the latter to the chamber 11. The area or diameter of the outlet 4 is preferably less than the diameter of the tube 12 for a purpose to be hereinafter described.

In operation, assuming the parts to be in the normal position shown in the drawing, as the piston rod is pulled outward and with it the tube 12, the piston will move with the rod due to the engagement of the piston with the abutment 14, the said engagement of the piston with the abutment connecting the piston chamber at the rear of the piston to the piston rod and shutting off communication between the piston rod and piston chamber at the front of the piston. During this movement of the piston liquid will be drawn from the reservoir into the piston chamber through the inlet 7 in front of the piston, while the air at the back of the piston will be ejected through the piston and ports 21 into the piston rod and from the piston rod through the tube 12 into the chamber 11, and from the latter through the tube 24 and discharge outlet. During the inward movement of the piston rod it will have a slight free movement independent of the piston until the piston engages with the abutment 20, this movement of the piston connecting the forward end of the piston chamber through the piston and ports 21 with the piston rod, and during the inward movement of the piston the liquid previously drawn into the piston chamber in front of the piston will be ejected through the piston and ports 21 into the piston rod, and from the piston rod through the tube 12 into the chamber 11 and from said chamber through the tube 24 and discharge outlet. By having the tube 12 of greater diameter than the tube 24 the volume of liquid in the chamber 11 will be greater than that which can be ejected through the tube 24 creating a pressure in the chamber 11 with the result that the liquid will be ejected through the tube 24 with increased force, and the outlet which is restricted with relation to the tube 24 will still further create a pressure and increase the force of the stream ejected through the outlet 4. During this forward movement of the piston liquid will be drawn into the piston chamber in back of the piston.

The piston chamber is preferably located at one side of the center of the reservoir, and to draw the liquid from the lowermost part of the reservoir I connect a flexible tubing to the suction means of the piston chamber, said tubing consisting of what is commercially termed "flexible metal hose," comprising spirally wound and interlocking or jointed sheet metal with asbestos packing in the joints.

In the embodiment shown two sections of tubes 25, 25 are connected at one end to a T-shaped intake or valve chamber 26 having a part extending in a plane longitudinally and co-axially of the reservoir with inlets in opposite ends, said intake being common to both of the suction inlets of the piston chamber, said tubes extending longitudinally of the reservoir with the free end of the inlet adjacent opposite ends of the reservoir. The nature of this tubing is such that it has a universal flexing movement and to cause the inlets to said tubes to automatically assume a position in the lowermost part of the reservoir the free end is weighted, as shown at 27.

The intake 26 is directly connected to the inlet 7 of the piston chamber, as at 28, and as shown, may be constructed to form the seat for the valve 9, and is connected to the inlet 8 by a tube 29, through a coupling 30 constructed to form the seat for the valve 10. The intake is preferably located substantially midway between the ends of the reservoir with the T-portion thereof located at some distance from the side of the reservoir, as shown, and by which construction the amount of flexure of the tube required to cause the inlets thereto to assume a position adjacent the side of the reservoir will be materially reduced.

It will be obvious that while, as shown, the ends of the tubing assume a position at the side of the reservoir which is directly opposite or below the piston chamber, should the syringe be held in a position with the piston chamber at the bottom the inlet ends of the tubing will assume a position adjacent said piston chamber, and the lowermost part of the reservoir.

To discharge the liquid from the reservoir with the discharge end of the syringe tilted upward or downward relative to a horizontal position, valve mechanism is provided to automatically shut off the inlet to the tubing which is uppermost from the intake 26 and connect the lowermost inlet to the tubing thereto, said valve mechanism consisting of a pair of valves 31 to cooperate with valve seats 32 connected to or formed in the ends of the T-portion of the intake 26, and said valves being connected by a rod 33 of greater length than the T-portion of the intake so that when one of the valves is seated the other will be unseated, as clearly shown.

The piston chamber, as in the application hereinbefore referred to, comprises a cylinder having a driving fit with the ends 34 and 35 and in which the suction inlets 7 and 8 are located, the piston chamber being clamped to the reservoir end 3 by the nut 18 cooperating with the end 35, the said end having a bore of the same diameter as and which may be a continuation of the cylinder bore and at the outer end internally screw threaded for the engagement of the nut 18 whereby to permit of the drawing of the piston mechanism by the removal of the nut 18. To properly position the pumping mechanism the end or head 35 has a projection 36 to engage in a recess 37 in the reservoir end 3.

To seal the pumping mechanism to prevent leakage when the syringe is not in use, I provide a tube 38 connected to the stuffing box 13 and in which the outlet end of the reciprocable tube 12 engages, this tube 38 being of a length to extend adjacent the discharge nozzle and carries a valve at its free end to engage with the discharge end of the tube 12 when the piston is in its inner-most position, this valve consisting of a disk 39 carried by a cap connected to the end of tube 38 and caused to be moved in a direction toward the tube 12 by a spring 40. The flow of the liquid from tube 38 into chamber 11 is through lateral ports 41. When the syringe is in use the inward movement of the valve is limited by the engagement thereof with the end of the tube 38. The tube 12 is of such length that when the piston rod is in its innermost position the end of the tube 12 will engage partly in the cap 39 and the valve will be firmly forced against the end of the tube by the spring 40. To lock the piston in its innermost position with the end of the tube 12 closed by the valve, I provide cooperating locking parts on the piston rod and reservoir consisting of a projection or pin 42 extending laterally from the piston rod and which is adapted to cooperate with a cam slot 43 in an annular extension of the nut 18.

The reservoir may be divided longitudinally by a partition or wall 44, providing two chambers in the reservoir one in which the pumping mechanism may be located and the other for the fire extinguishing liquid in which the intake for the pumping mechanism engages.

Having thus described my invention I claim:—

1. In a syringe, the combination with a reservoir having an outlet, of a piston chamber; a piston to reciprocate in said chamber; a tube reciprocable with the piston to connect the piston chamber with the outlet of the reservoir; and a valve to cooperate with the outlet end of said tube when the piston is in its innermost position, substantially as and for the purpose specified.

2. In a syringe, the combination with a reservoir having an outlet, of a piston chamber; a piston to reciprocate in said chamber; a compression chamber connected to the reservoir outlet; a tube reciprocable with the piston to connect the piston chamber with the compression chamber; and a valve in the compression chamber to cooperate with the outlet end of said tube when the piston is in its innermost position, substantially as and for the purpose specified.

3. In a syringe, the combination with a reservoir having an outlet, of a piston chamber; a piston to reciprocate in said chamber; a tube reciprocable with the piston and through which the liquid is discharged from the piston chamber; and means to connect the said tube to the reservoir outlet including a valve to cooperate with the end of the tube when the piston is in its innermost position, substantially as and for the purpose specified.

4. In a syringe, the combination with a reservoir having an outlet, of a piston chamber; a piston to reciprocate in said chamber; a compression chamber connected to the reservoir outlet; a tube reciprocable with the piston to connect the piston chamber with the compression chamber; a rod to reciprocate the piston and tube; a valve in the compression chamber to cooperate with the end of the reciprocable tube within said chamber to close said end of the tube when the piston is in its innermost position, substantially as and for the purpose specified.

5. In a syringe, the combination with a reservoir having an outlet, of a piston chamber; a piston to reciprocate in said chamber; a compression chamber connected to the reservoir outlet; a tube reciprocable with the piston to connect the piston chamber with the compression chamber; a rod to reciprocate the piston and tube; a valve in the compression chamber to cooperate with the end of the reciprocable tube within said chamber to close said end of the tube when the piston is in its innermost position and cooperating locking means carried by the piston rod and reservoir to maintain the piston mechanism in position with the tube closed by the valve, substantially as and for the purpose specified.

6. In a syringe, the combination with a reservoir having an outlet, of a piston chamber; a piston to reciprocate in said chamber; a compression chamber connected to the reservoir outlet; a tube reciprocable with the piston to connect the piston chamber with the compression chamber; a rod to reciprocate the piston and tube; a tube in the compression chamber fixed at one end to the piston chamber and the other end extending adjacent the reservoir outlet in which the reciprocable tube engages, said tube having lateral ports to connect it with the compression chamber; a spring influenced valve carried at the free end of said tube to close the end of the reciprocable tube when the piston is in its innermost position; and cooperating locking means carried by the piston rod and reservoir to maintain the piston in its innermost position with the end of the reciprocable tube closed by the valve, substantially as and for the purpose specified.

7. In a syringe, the combination of a liquid carrying reservoir having an outlet, of a fixed piston chamber; a second chamber exterior of the piston chamber and at the inner end of the piston chamber; means to connect the piston chamber with the second chamber; piston mechanism operable in the piston chamber to alternately draw liquid from the reservoir to opposite sides of the piston and discharge the liquid from opposite sides of the piston into said second chamber; valve means operable within said second chamber to shut off communication between the liquid in the reservoir and the exterior of the reservoir; and means to lock the piston against movement.

8. In a fire extinguisher, the combination of a container for fluid having an outlet, of a piston chamber; a second chamber connected to the piston chamber and container outlet; piston mechanism to draw liquid to the piston chamber and discharge it into said second chamber from opposite sides of the piston; and valve means contained within said second chamber to open up and shut off communication between the piston and said second chambers for the purpose specified.

9. In a syringe, the combination of a reservoir to contain a fluid and having a discharge outlet; a piston chamber supported in a fixed position in communication with the reservoir and connected at opposite ends with the reservoir; a chamber located at the inner end of the piston chamber connected to the piston chamber and the reservoir outlet in which chamber the liquid discharged thereinto from the piston chamber is placed under pressure; piston mechanism to alternately draw liquid from the reservoir to opposite ends of the piston chamber and discharge it into the second chamber; and valve mechanism within the second chamber operable by the action of the piston mechanism to open up and to shut off communication between the piston chamber and the exterior of the reservoir; and means to lock the piston in its innermost position.

10. In a syringe, the combination of a reservoir having a discharge outlet; a piston chamber supported in a fixed position in communication with the reservoir; a compression chamber to connect the piston chamber at one end to the reservoir outlet; a piston; valve mechanism to control the entrance of liquid to and its discharge from the piston chamber at opposite sides of the piston; and a valve operable when the piston is in its innermost position to shut off communication between the piston and compression chambers, for the purpose specified.

11. In a syringe, the combination with a reservoir having an outlet, of a piston chamber; a piston to reciprocate in said chamber; a tube reciprocable with the piston to connect the piston chamber with the reservoir outlet; and a valve to cooperate with said tube to seal the reservoir outlet.

12. In a syringe, the combination with a liquid carrying reservoir having an outlet, of pumping mechanism including a piston chamber and a piston to reciprocate in said chamber; a tube reciprocable with the piston to connect the piston chamber with the reservoir outlet; means connected to the pumping mechanism to draw liquid into the piston chamber from near that portion of the liquid reservoir which is lowermost; and a valve exterior of the piston chamber to shut off communication between the pumping mechanism and the exterior of the liquid reservoir.

13. In a fire extinguisher a liquid carrying reservoir having a fixed discharge outlet; a piston chamber in communication with said reservoir; a piston to reciprocate in said chamber having an operating handle at one end; valve controlled inlet ports to said chamber adjacent opposite ends thereof; a second chamber located at the inner end of the piston chamber opposite the operating handle and in communication with the reservoir outlet; valve controlled outlet ports from the piston chamber at opposite sides of the piston connected to said second chamber; and valve mechanism exterior of the piston chamber operable when piston is in its innermost position to shut off liquid communication between the reservoir and the discharge outlet.

14. In a fire extinguisher a liquid carrying reservoir having a discharge outlet; a piston chamber in communication with said reservoir; a piston to reciprocate in said chamber; suction inlet ports to the piston chamber adjacent opposite ends thereof; a second chamber exterior of the piston chamber and located at the inner end of the piston chamber in communication with the reservoir outlet; valve controlled means to control the discharge of liquid from opposite sides of the piston through said second chamber and the reservoir outlet; valve mechanism operable within the second chamber when the piston is in its innermost position to shut off the liquid in the reservoir from the reservoir outlet.

15. In a fire extinguisher, a liquid carrying reservoir having an outlet; a fixed piston chamber; a piston to reciprocate in said chamber; valve controlled inlet ports adjacent opposite ends of said chamber in communication with the reservoir; a second chamber located at the inner end of the piston chamber to connect the piston chamber with the reservoir outlet; means operable in said chamber when the piston is in its innermost position to shut off communication between the piston chamber and the reservoir outlet and operable during the initial outward movement of the piston to open up communication between the piston chamber and reservoir outlet; and means to lock the piston from movement when in its innermost position.

16. In a fire extinguisher, a liquid carrying chamber having an outlet; a fixed piston chamber in communication with said liquid carryng chamber; a piston reciprocable in said chamber having an operating handle; valve mehanism to control the entrance of liquid to and its discharge from the piston chamber at opposite sides of the piston; intake means in communication with said pumping mechanism to draw liquid from near that portion of said liquid carrying chamber which is lowermost during the operation of the piston; a second chamber located at the inner end of the piston chamber opposite the handle to connect the pump chamber with the reservoir outlet; and valve means in said second chamber operable by the action of the piston mechanism to shut off liquid communication between the liquid chamber and the exterior of said chamber.

17. In a fire extinguisher, the combination of a chamber for carrying liquid having an outlet; reciprocable piston pumping mechanism in communication with said chamber; suction inlets adjacent opposite ends of the pump; means to discharge the liquid from the pump chamber at opposite sides of the piston; intake means in said chamber in communication with said suction inlets arranged to operate about an axis transverse to the axis of the pump chamber and arranged to draw liquid from near that portion of the liquid carrying chamber which is lowermost in whatever position the reservoir may be held during the operation of the pumping mechanism; a second chamber located at the inner end of the pumping mechanism to connect the pumping mechanism with the outlet of the liquid carrying chamber; means in said chamber operable for shutting off communication between the liquid chamber and outlet of said chamber; and means to lock the pumping mechanism from movement.

18. In a fire extinguisher, the combination of a liquid carrying reservoir having an outlet; pumping mechanism with fixed pump cylinder having suction inlets adjacent opposite ends thereof; and means to discharge liquid from the pump cylinder from opposite sides of the piston; intake means for the suction inlets operated by gravity within the liquid carrying reservoir for connecting the pump with the liquid near that portion of the reservoir which is lowermost; a casing having a chamber in communication with the outlet of the reservoir; a second chamber in line of communication between the pump cylinder and reservoir outlet; and valve mechanism in said latter chamber operable by the action of the pumping mechanism to shut off communication between the liquid in the reservoir and the exterior of the reservoir.

19. In a fire extinguisher, the combination of a liquid carrying reservoir having an outlet; pumping mechanism, having a fixed pump cylinder with suction inlet ports adjacent opposite ends of the pump cylinder and means to discharge the liquid from opposite sides of the piston, in communication with said reservoir; intake means to said pumping mechanism arranged to assume a position by gravity near that portion of the reservoir which is lowermost; a chamber arranged to connect said intake means to the suction inlets; a chamber at the inner end of the pumping mechanism to connect the pumping mechanism with the reservoir outlet; means in said chamber to shut off communication between the liquid in the reservoir and the exterior of the reservoir when the piston of the pumping mechanism is in its inner position.

20. In a fire extinguisher, the combination of a chamber for carrying a liquid and having an outlet; a reciprocable piston mechanism and fixed piston chamber in communication with said liquid carrying chamber; means to reciprocate the piston including a handle located at the end opposite the outlet; suction inlet means to the piston chamber in communication with the liquid carrying chamber; intake means to the inlet means of the piston chamber operable by gravity and pendantly supported to move about an axis transverse to the axis of the piston cylinder, said intake being in the liquid carrying chamber and operable to connect the piston chamber with the liquid near that portion of the liquid carrying chamber which is lowermost; a chamber located at the inner end of the piston chamber; valve mechanism operable in said chamber to shut off communication between the pump and the exterior of the liquid carrying chamber.

21. In a liquid projector, a liquid carrying chamber; a pump to discharge the liquid from said chamber including a cylinder and a reciprocable piston member having an operating handle; a chamber located at the end of the pump cylinder opposite to its operating handle and having an outlet; means within said chamber positively operable by the reciprocable member to open up and shut off communication between the liquid carrying chamber and the outlet; and means to lock the piston in its innermost position.

22. In a fire extinguisher, a reservoir for a liquid, having a discharge nozzle; a pump comprising a cylinder and a reciprocable piston; a chamber at the inner end of the pump cylinder in communication with the liquid reservoir; a passage leading from the nozzle to the chamber; means in said chamber positively operable by movement of the piston to open up and shut off communication between the liquid reservoir and the nozzle orifice; and means to lock the piston against movement.

23. In a liquid projector, a liquid chamber with an outlet; a pump operable to discharge the liquid from said outlet; said pump including a cylinder and a reciprocable piston having a handle; a member reciprocable with the piston; a chamber located at the end of the pump cylinder opposite to the handle to connect the liquid chamber with the outlet; means in said chamber operable by the member reciprocable with the piston to open up and shut off communication between the liquid chamber and the outlet; and means to lock the piston in its innermost position.

24. In a fire extinguisher, a liquid carrying reservoir having a discharge outlet; a fixed piston chamber in communication with the liquid in said reservoir; a piston to reciprocate in said chamber; a chamber located at the inner end of the piston chamber and in communication with the piston chamber and discharge outlet; and valve means within said second chamber to shut off communication between said second chamber and the piston chamber with the discharge outlet open to said second chamber.

25. In a fire extinguisher a liquid carrying chamber having means of discharge; a reciprocable piston pumping mechanism having a handle and located outside of said liquid carrying chamber in communication with said liquid carrying chamber having several suction inlet ports to the pumping mechanism; valve mechanism to control the entrance of liquid to and its discharge from the pumping mechanism; intake means in communication with the suction inlet ports and located in the liquid carrying chamber operable to connect the pumping mechanism with the liquid near that portion of the liquid chamber which is lowermost; a chamber located in the line between the pumping mechanism and the outlet of the liquid carrying chamber; valve means in said chamber to shut off communication between the liquid carrying chamber and its exterior.

26. In a fire extinguisher, a liquid carrying chamber having an outlet; a reciprocable piston pumping mechanism having a handle and located outside of said liquid carrying chamber in communication with said liquid carrying chamber having several suction inlet ports to the pumping mechanism; valve mechanism to control the entrance of liquid to and its discharge from the pumping mechanism; intake means connected to the suction inlets and located in the liquid carrying chamber operable to draw liquid from near that portion of the chamber which is lowermost, a chamber located in the line between the pumping mechanism and the outlet of the liquid carrying chamber; valve means in said chamber to shut off communication between the liquid carrying chamber and its exterior; and a shielding means operable to protect the pump cylinder and mechanism against dent and accident.

27. In a fire extinguisher, a liquid carrying reservoir having an outlet; a fixed piston chamber; a reciprocating piston mechanism operable by a handle to reciprocate in said chamber; valve controlled inlet ports adjacent opposite ends of said chamber in communication with said reservoir; a chamber located at the inner end of the piston chamber opposite the handle to connect the piston chamber with the reservoir outlet; means reciprocable with the piston mechanism and operable within said chamber when the piston mechanism is initially withdrawn to open up communication between the liquid carrying reservoir and the exterior of said reservoir, and when the piston is in its innermost position to shut off communication between the liquid carrying reservoir and the exterior of said reservoir.

GEO. T. PEARSONS.